(12) United States Patent
Rodriguez

(10) Patent No.: US 7,568,332 B2
(45) Date of Patent: Aug. 4, 2009

(54) MECHANIZED HARVESTING MACHINE WITH ROTATING PICKING ELEMENTS

(75) Inventor: Henry Rodriguez, Animas, NM (US)

(73) Assignee: Santa Fe Ingredients, Animas, NM (US)

( * ) Notice: Subject to any disclaimer, the term of this patent is extended or adjusted under 35 U.S.C. 154(b) by 0 days.

(21) Appl. No.: 11/781,092

(22) Filed: Jul. 20, 2007

(65) Prior Publication Data
US 2009/0019827 A1    Jan. 22, 2009

(51) Int. Cl.
A01D 45/00    (2006.01)

(52) U.S. Cl. .................................... 56/327.1

(58) Field of Classification Search ............... 56/327.1, 56/13.2, 126–130, 330, 331, 109, DIG. 19; 209/315, 393, 395; 171/129; 460/142
See application file for complete search history.

(56) References Cited

U.S. PATENT DOCUMENTS

| 2,874,528 | A | * | 2/1959 | Esch .......................... 56/126 |
| 3,568,419 | A | * | 3/1971 | Creager ...................... 56/14.1 |
| 3,830,048 | A | * | 8/1974 | Ervin .......................... 56/331 |
| 4,196,570 | A |   | 4/1980 | Rodriguez |
| 4,257,217 | A | * | 3/1981 | McClendon ............... 56/327.1 |
| 4,367,622 | A | * | 1/1983 | Aron et al. .................... 56/364 |
| 4,546,602 | A | * | 10/1985 | Cosimati ................... 56/327.1 |
| 5,119,720 | A |   | 6/1992 | Rodriguez |
| 5,174,093 | A |   | 12/1992 | Rodriguez |
| 5,210,999 | A | * | 5/1993 | Cosimati ................... 56/327.1 |
| 5,644,977 | A |   | 7/1997 | Rodriguez |
| 5,678,976 | A |   | 10/1997 | Rodriguez |
| 5,709,071 | A | * | 1/1998 | Cosimati ................... 56/327.1 |
| 6,003,293 | A | * | 12/1999 | Boese ....................... 56/327.1 |
| 6,170,244 | B1 |   | 1/2001 | Coers et al. |
| 6,199,703 | B1 | * | 3/2001 | Boese ........................ 209/315 |
| 6,338,236 | B1 |   | 1/2002 | Rodriguez |
| 6,419,093 | B2 | * | 7/2002 | Boese ........................ 209/670 |
| 2005/0210853 | A1 |   | 9/2005 | Massey et al. |

OTHER PUBLICATIONS

Abernathy, George et al.: "Chile Machine Harvesting Trials", College of Agriculture and Home Economics, Report 28, pp. 1-11.
Abernathy, George et al.: "Chile Machine Harvesting Observations: 2004," College of Agriculture and Home Economics, Report 24, pp. 1-7.
Eaton, Frank et al.: "Refinement and Testing of Mechanical Cleaners for Red Chile", College of Agriculture and Home Economics, Report 22, pp. 1-11.
Herbon, Ryan et al.: "Design and Development of a Prototype Mechanical Gap Sorter for Mechanically Harvested Red Chile," College of Agriculture and Home Economics, Report 25, pp. 1-15.

* cited by examiner

Primary Examiner—Árpád Fábián-Kovács
(74) Attorney, Agent, or Firm—Foley & Lardner LLP

(57) ABSTRACT

A harvesting device for mechanical harvesting of vegetables and the like. A pair of circular supports rotates on an axle disposed and are disposed in a housing. The circular supports are positioned on opposite sides of a picking path defined by a void in the housing and through which the vegetables pass as the harvester moves. Each circular support having at least one picking element extended into the picking path.

10 Claims, 8 Drawing Sheets

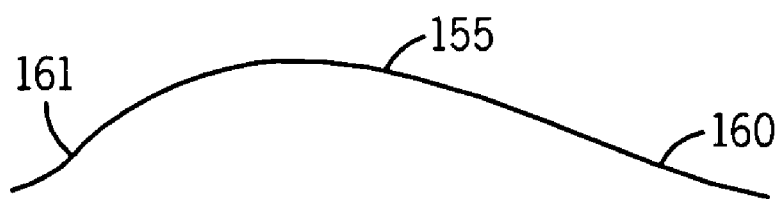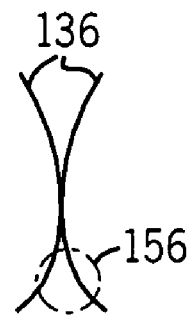
FIG. 9A  FIG. 9B
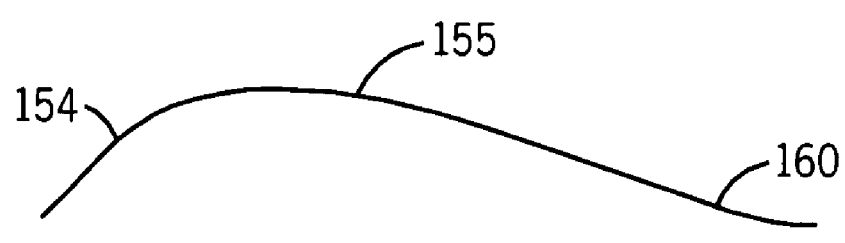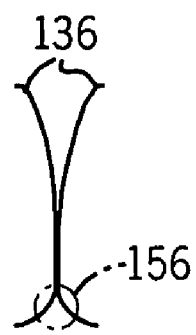
FIG. 9C  FIG. 9D ically provide a low tolerance for variability in the position of the plants.

MECHANIZED HARVESTING MACHINE WITH ROTATING PICKING ELEMENTS

BACKGROUND OF THE INVENTION

Mechanized harvesting has been adopted for use with many large-scale crops, especially grains such as corn and wheat. However, harvesters for certain crops, such as vegetables and fruits, have not developed into a completely mechanized model for various reasons. For many crops, the cost of workers to hand pick crops is so low that mechanized picking remains economically unfeasible with prior devices. In addition, crops such as vegetables and certain fruits present a difficult physical barrier in that the crops are not easily picked using prior designs. A further complication in many industries is that current devices utilize a destructive picking mechanism, where the plant is destroyed to the extent it will not yield crop again, whereas hand-picking may allow subsequent harvesting from the same plant.

For many crops, such as vegetables, the cost of hand-picking is rising as fewer and fewer workers are available to pick more and more acreage. Prior art machines designed for picking vegetables suffer from several flaws. First, many of the prior art devices require several operators and or highly skilled operators. Second, most prior art devices gather up the plants and remove them from the ground, separating the crop from the plant and discarding the remainder as refuse. In addition, a third issue with prior art devices is that for many types of vegetables, these devices result in a damaged crop. Finally, prior art devices have required very precise plantings to be compatible with the device and such prior art devices typically provide a low tolerance for variability in the position of the plants.

SUMMARY OF THE INVENTION

The present invention is directed to a mechanical harvester. In one embodiment, the mechanical harvester comprises a harvesting device having a housing and an axle disposed therein transverse to the direction of travel of the harvester. Substantially disposed in the housing are at least a pair of circular supports positioned perpendicular to the axle and affixed thereto such that the circular support rotates when the axle is rotated. Each circular support itself is comprised of an inner hub and an outer circular arm. At least one picking element is disposed therebetween. The at least one picking element has a curvilinear shape and extends from a plane defined by the circular support into a plane defined by the picking path. Each circular support in a set of supports is positioned on opposite sides of the cutting path such that their respective picking elements extend towards the other circular support.

In one embodiment, the harvester further comprises a gatherer positioned at the front opening of the housing. The gatherer has a first end, a curved portion, and a second end. The first end is affixed to the housing and the gatherer extends out away from the housing and downward below the housing. The gatherer bends back at the curved portion towards the housing and upward towards the opening, extending into the picking path. The second end is positioned in the picking path substantially adjacent the at least one picking element. When the mechanical harvester moves forward to engage a plant, the gatherer travels substantially at or just below ground level. The gatherer engages any low-lying branches of the plant and guides them into the picking path and engagement by the picking elements, thus resulting in a more efficient picking of the plant.

These and other features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 9a illustrates one embodiment of the picking elements; 9b illustrates the profile of a pair of picking elements of FIG. 9a; FIG. 9c illustrates an alternative embodiment of the picking elements designed to pick a larger portion of a plant; and FIG. 9d illustrates the profile of a pair of picking elements of FIG. 9c.

DETAILED DESCRIPTION OF THE PREFERRED EMBODIMENTS

Figure 1:
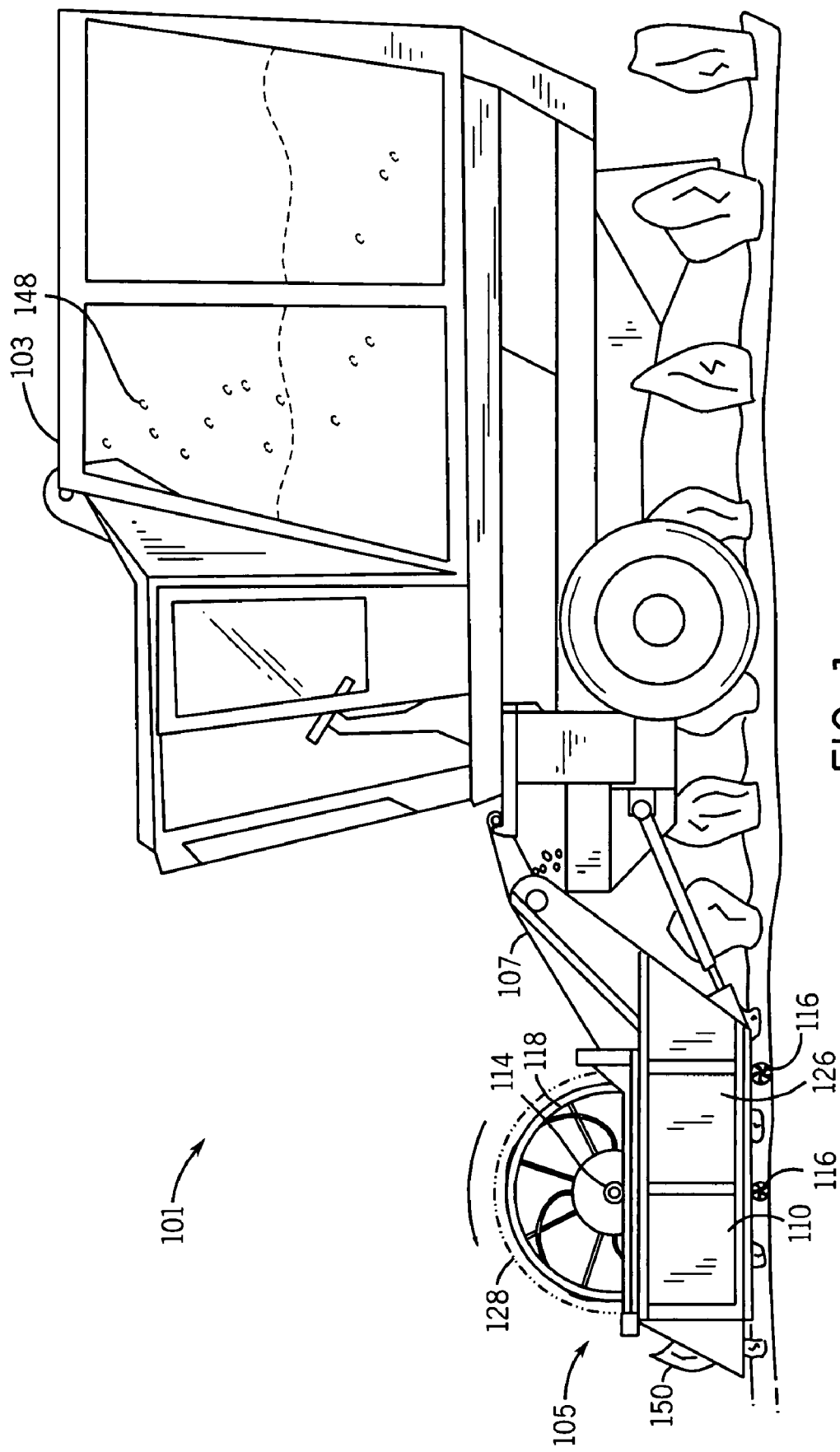
FIG. 1 is a side-view illustration of a mechanized harvester in accordance with one embodiment of the present invention.

Referring to FIG. 1, a mechanized harvester 101 constructed in accordance with an embodiment of the invention is shown. The mechanized harvester 101 generally consists of a tractor 103 having a harvesting device 105 and further includes a transportation system 107 for a crop 148. The tractor 103 can be of any of the various embodiments known to one of ordinary skill in the art. In one embodiment, the harvesting device 105 is affixed to the front of the tractor 103; and the transportation system 107 for a crop 148 is in operative communication with the harvesting device 105 and supported by the tractor 103.

Figure 2:
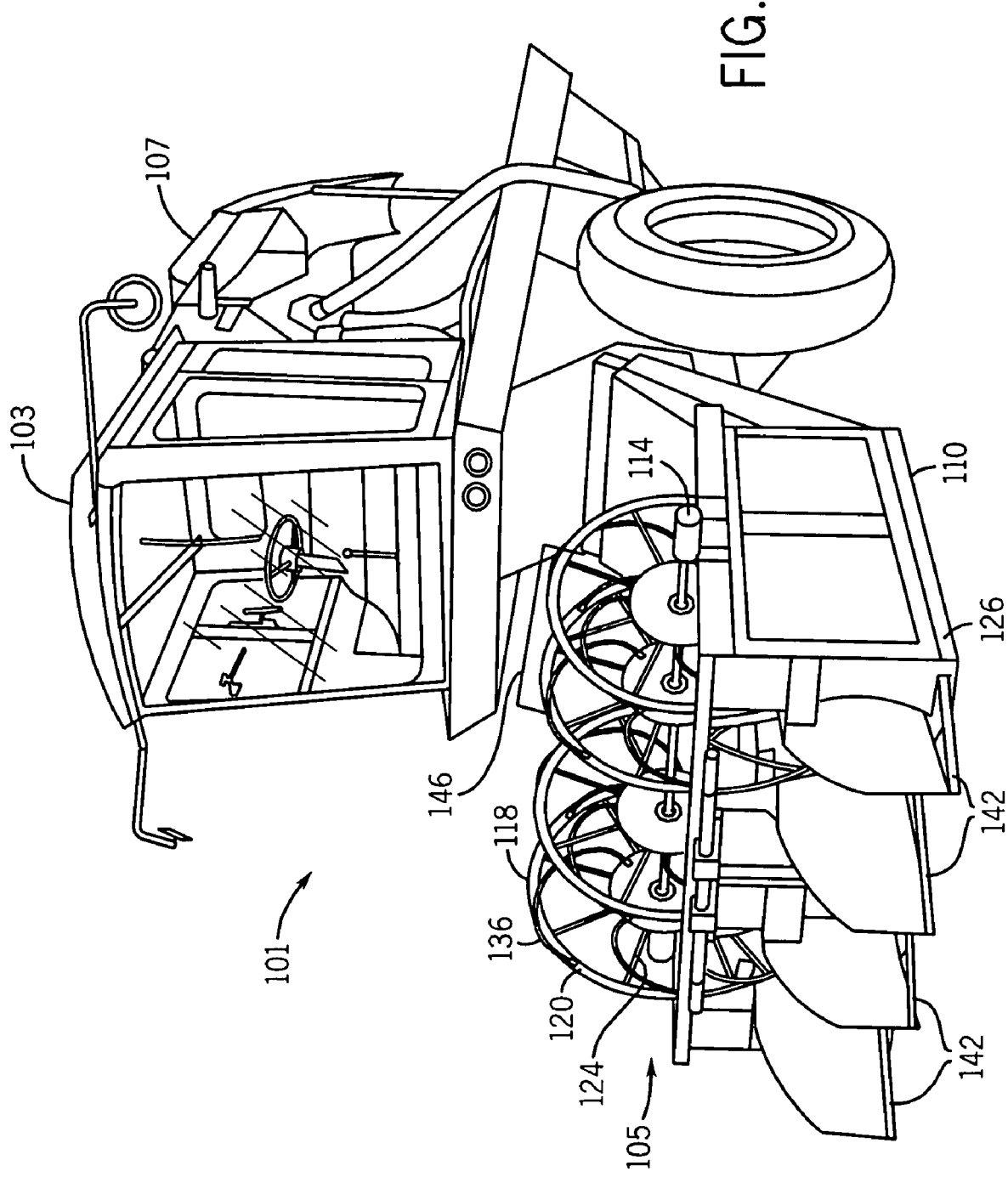
FIG. 2 illustrates a perspective view of one embodiment of a harvesting device.
Figure 3:
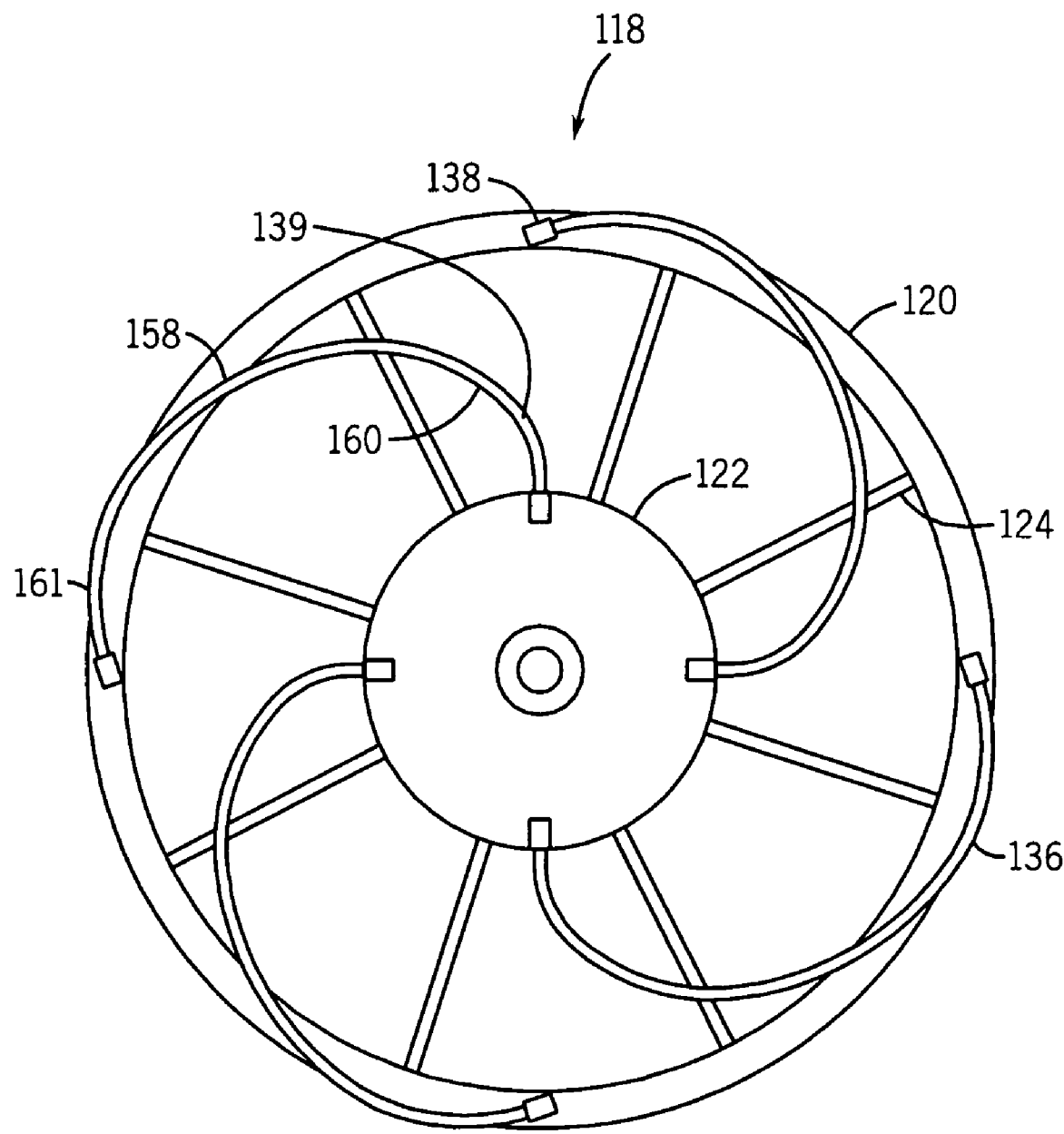
FIG. 3 illustrates a partial cut-away view of the harvesting device of FIG. 2 along line A-A.
Figure 4:
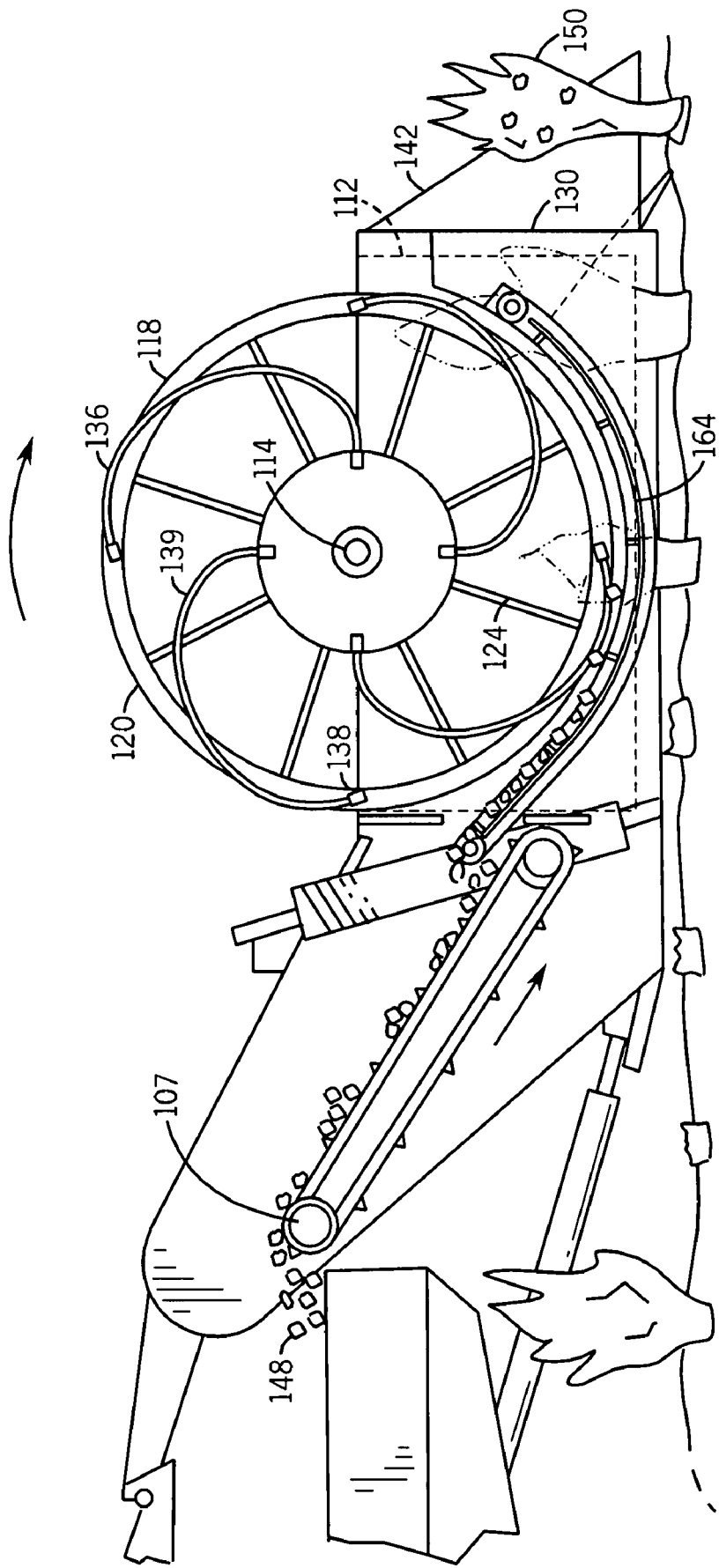
FIG. 4 is a side cut-away illustration of the harvesting device in the process of harvesting crop from a row of plants.

Turning now to FIGS. 2-4, the harvesting device 105 is shown in greater detail. FIG. 2 illustrates a general embodiment of the harvesting device 105 (having a top portion 128 removed), including a housing 110, a frame 112 supporting the housing 110, and a transverse axle 114 positioned perpendicular to the longitudinal axis of the mechanized harvester 101 (and the normal direction of travel of the harvester 101). The frame 112 supports the housing 110 and is attached to the tractor 103. In one embodiment, the frame 112 includes a set of skids or wheels 116 to support the weight of the harvesting device 105.

The housing 110 serves to provide for increased safety and also increased harvest yield of the crop 148 by retaining the harvested crop 148 such that it is captured by the transportation system 107 (see FIG. 4). In one embodiment, the housing 110 includes a lower portion 126 and an upper portion 128. The lower portion 126 may be rectangular and the upper portion 128 may be semi-cylindrically shaped to accommodate the circular arm 120. The lower portion 126 includes a passage therethrough allowing the crop 148 to enter through a front opening 130, pass along a picking path 132 in the harvesting device 105, and exit through a back opening 134 in the lower portion 126. In one embodiment, guide members 142 extend from the front opening 130 to form an extended portion of the picking path 132. Preferably, the guide members 142 are curved slightly away from the guide path resulting in the guide opening 144 being larger than the front opening 130. This structure allows for greater tolerance in the positioning of plants 150 in a row or for positioning of the rows in relation to the picking path 132 as the plant 150 that is not centered along the picking path 132 will nonetheless be guided into the housing 110 and thus into contact with a picking elements 136.

The axle 114 extends transversely across the frame 112. In an exemplary embodiment, the axle 114 extends substantially across the width of the frame 112. A circular support 118 is attached to the axle 114. In one embodiment, the circular support 118 comprises an outer circular arm 120, and inner hub 122 and connection arms 124. The connection arms 124 connect the outer circular arm 120 to the inner hub 122, providing support for the outer circular arm 120. The inner hub 122 is affixed to the axle 114 such as to allow rotation of the inner hub 122, and thus the circular support 118, as the axle 114 rotates.

The circular support 118 includes the picking element 136. The picking element 136 is a curved member that extends from an inner portion of the circular support 118 to an outer portion of the circular support 118. In one embodiment, the picking element 136 extends from the inner hub 122 to the outer circular arm 120 in an arcuate fashion. Thus, in an exemplary embodiment, the length of the picking element 136 will be longer than the radius of the circular support 118.

The number and spacing of the picking elements 136 may be varied in accordance with the plants to be picked and the speed with which the circular support 118 is rotated by the axle 114. In one preferred embodiment, the circular support 118 includes four of the picking elements 136 spaced equidistant around the circular support 118. In one embodiment, the transportation system 107 includes a trough 164 substantially adjacent each of the at least one circular supports 118 and the trough 164 having an edge parallel with the normal direction of motion of the tractor 103 and defining one side of the picking path 132 and the trough 164 in communication with the transportation system 107 associated with the tractor 103. The crop 148 is deposited in the trough 164 as it is picked by the picking elements 136 attached to the circular support 118 with which the trough 164 is associated.

Figure 5:
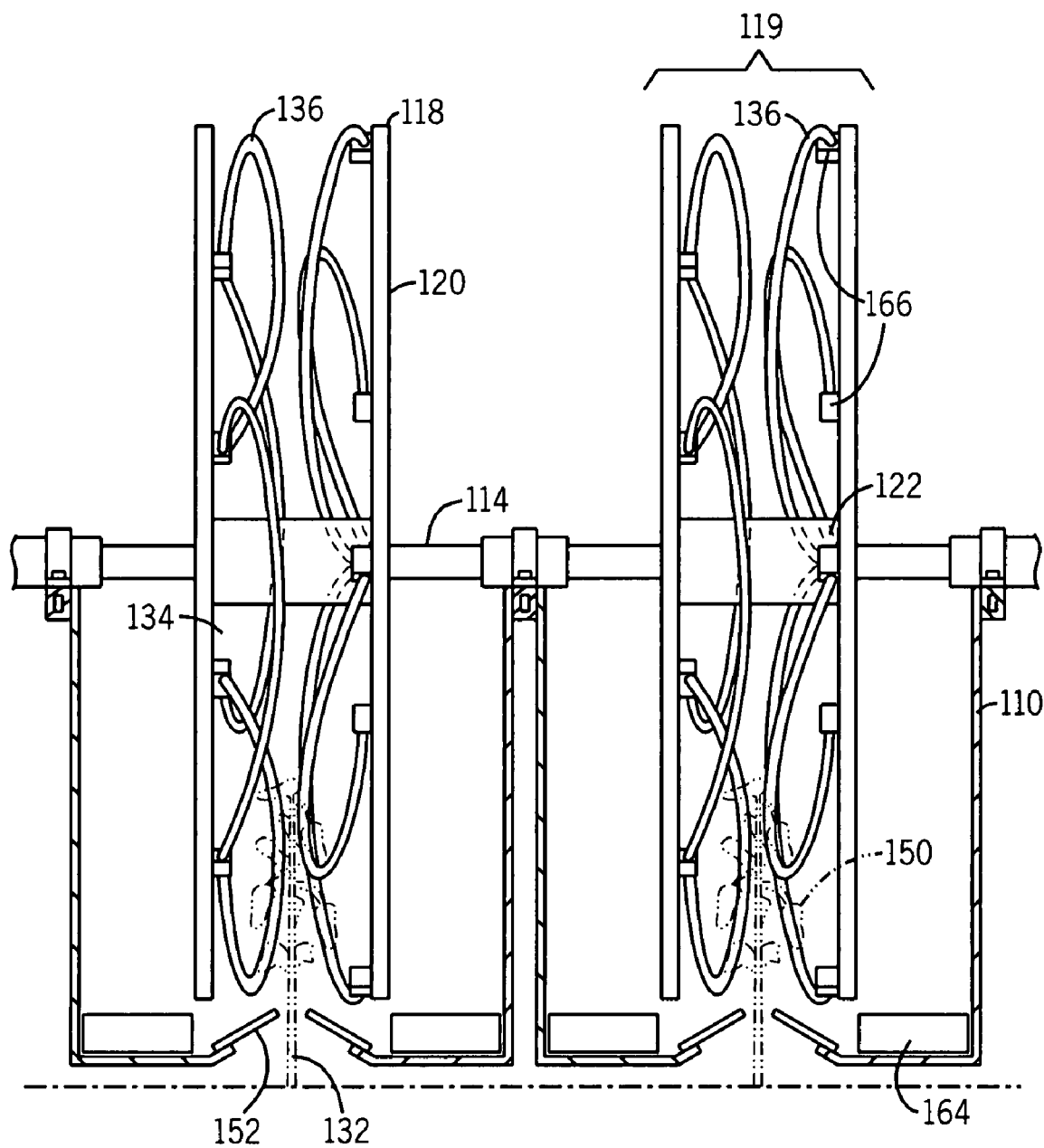
FIG. 5 illustrates a front-view of a pair of circular supports having picking elements extending into a picking path.
Figure 6:
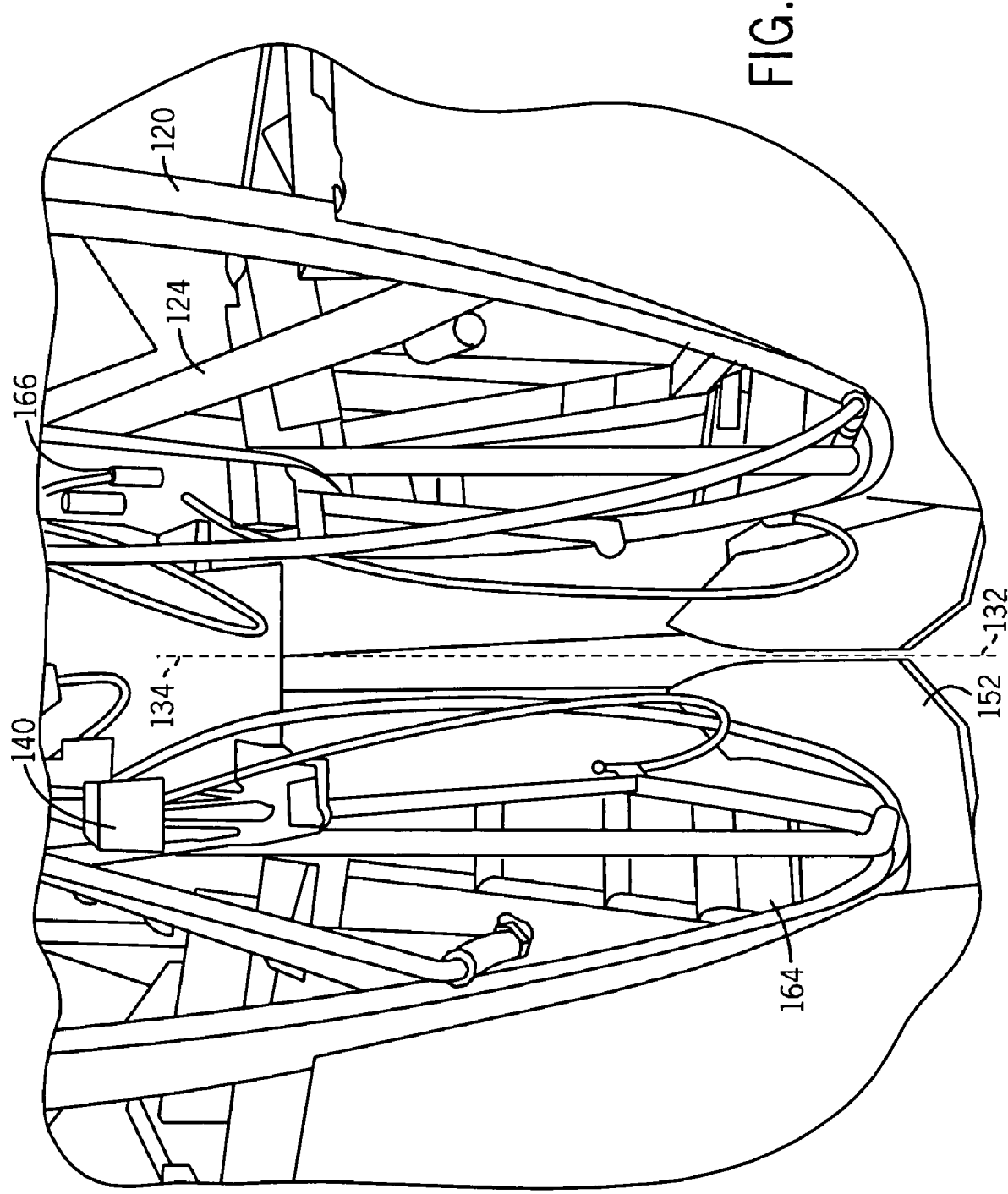
FIG. 6 illustrates a partial view of a picking element positioned on a circular support and directing picked peppers into the transport trough.

As seen in FIG. 5, a pair 119 of circular supports 118 are positioned with one of the supports 118 on each side of the picking path 132. Extending from the circular support 118, into the plane defined by the picking path 132, are a plurality of the picking elements 136. The picking elements 136 are the component of the harvesting device 105 which actually engage the plant 150 and remove the crop 148 from the plant 150. The pair 119 of circular supports 118 face each other such that the picking elements 136 of both extend towards or into the plane of the picking path 132 and preferably engage the full height of the plant 150. In one embodiment, the picking elements 136 of one of the circular supports 118 in the pair 119 are offset from the picking elements 136 of the other circular support 118 in the pair 119. While this offset may be selected to achieve a desired picking rate or profile, in the embodiment described above utilizing four of the picking elements 136 spaced apart 90 degrees; on each circular support 118, the picking elements 136 of the paired circular supports 118 are spaced apart forty-five degrees and the opposing picking elements 136 are separated by about two inches to allow space for the plant 150. It should be appreciated that the picking elements 136 may extend more than halfway into the picking path 132 from the respective circular supports 118, but because of the offsetting of the opposing picking elements 136, the plant 150 will be pushed slight off-center to accommodate the picking elements 136. In such embodiments, care must be take to select a rotational speed and spacing of the picking elements 136 so as to minimize damage to the plants 150 from this movement.

In one embodiment, the picking elements 136 of the harvesting device 105 are not all identical. The use of the picking elements 136 of differing shape, size, and curvature may allow for different picking patterns such as harvesting more of the low-hanging crop 148 or capturing a larger percentage of the total crop 148 on the plant 150. The picking elements 136 may vary such as by having different degrees of curvature or different lengths. In one embodiment, each circular support 118 in the pair 119 has identical picking elements 136, though the picking elements 136 on the same circular support 118 may differ. Thus the exact shape of the picking elements 136, aside from having a generally arcuate design, may be varied as needed for each type of plant 150 to be picked. However, in an exemplary embodiment best shown in FIG. 3 and FIGS. 9a and 9c, the picking elements 136 are curved in two planes, having a large arcuate middle portion 158 and two smaller curved end portions 160, 161. The curved end portions 160, 161 curve in the lateral direction while the curve of the middle portion 158 is in the longitudinal direction, thus the smaller curved portions serve to protrude the picking elements 136 from the circular support 118 to which they are connected. In one embodiment, the picking elements 136 have a length approximately ¾ of the diameter of the circular supports 118. In an exemplary embodiment, the circular supports 118 have a diameter of about 60 inches and the picking elements 136 have a length of about 44 inches. In an further embodiment, the picking elements 136 can be viewed as oblate ellipsoids, wherein the main portion of picking elements 136 define a plane that is different than the plane about which the picking elements 136 rotate (i.e., the plane defined by the circular supports 118). In an exemplary embodiment, the equatorial (longitudinal) radius (i.e. ½ the farthest distance between the curved end portions 160, 161) is smaller than the polar (lateral) radius (i.e. the farther distance of a line from the middle portion 158 bisecting a line extending from one curved portion 160 to the other portion 161.

In one embodiment, the picking elements 136 comprise a curvilinear shape as shown in FIGS. 9a-b. In this embodiment, the opposing picking elements form a picking profile as shown in FIG. 9b, having an area 156 where no crop 148 will be picked. In order to minimize this area 156, in another embodiment, the picking elements 136 have a preferred shape for minimizing the amount of the plant 150 not exposed to the picking elements 136. For example, as shown in FIG. 9c, for plants such as pepper plants, the picking elements 136 may have a smaller curve portion 160 and a more severe lower curve area 154 which engages the bottom of the plant 150. Due to the positioning of the lower curve 154 or the picking elements 136 at the bottom of the plant 150 when the picking element rotates through the plant 150, the shape and positioning of the lower curved area impacts the amount of crop 148 picked from the lower portion of the plant 150, thus exhibiting a picking profile as shown in 9d, with a reduced area 156 where no crop 148 will be picked. It is believed that this shape achieves a higher harvest yield from the plants 150 that include low hanging and the centrally positioned crops 148, such as but not limited to pepper bushes.

The harvesting device 105 may comprise a plurality of the circular supports 118, each having a plurality of the picking elements 136. As described above, in a preferred embodiment, the harvesting device 105 includes the paired circular supports 118. Each pair 119 of the circular support 118 pair 119, the corresponding picking path 132, and the adjacent transportation system 107 form a picking unit 146. A picking unit 146 is able to accept a row of the crop 148 as described below. It may be desirable for the harvesting device 105 to include a plurality of the picking units 146 such that the mechanized harvester 101 can pick multiple rows of the plants 150 at the same time. However, if too many of the picking units 146 are used, the mechanized harvester 101 becomes unwieldy, such as by having a large turning radius. Therefore, in one exemplary embodiment, the mechanized harvester 101 includes the harvesting device 105 with the two picking units 146. In one embodiment, the picking unites 146 are adjustable relative to each other, such as along track adjusted by a screw-type mechanism. This embodiment provides for adjustment of the spacing of the respective picking units 146, thus allowing for adjustment to accommodate various crop row widths.

The harvesting device 105 operates, in one preferred embodiment, as follows. The tractor 103 moves the harvesting device 105 into position such that the picking path 132 of each of the picking units 146 aligns with a row of the plants 150 to be picked. The tractor 103 then travels down the length of the row. The transverse axle 114 rotates in the direction of travel (i.e. the same as the wheels or tracks of the tractor 103), thus rotating the circular supports 118 that are affixed thereto. The rotation of the circular supports 118 results in the picking elements 136 rotating as well. The picking elements 136 travel a path which sweeps in an arc parallel with the picking path 132. The picking path 132 is substantially aligned with a row of the plants 150 to be picked. As the harvester 101 moves along the row of the plants 150, individual ones of the plants 150 enter the front opening 130 of the housing 110. As the plant 150 enters the housing 110 and travels along the picking path 132, one of the rotating picking elements 136 comes in contact with the top of the plant 150 and sweeps down in an arcing motion through the plant 150 in the same direction as the plant 150 is traveling (relative to the harvester 101). On this "downstroke" the picking element 136 passes through the plant 150.

When the plant 150 is positioned substantially below the center of the circular support 118, the rotational path of the picking element 136 results in the picking element 136 arcing upwards through the plant 150. This upward movement of the picking element 136 through the plant 150 results in the crop 148 sliding along the picking element 136 towards the adjacent collection trough 109 until the crop 148 is snapped off of the plant 150 due to the resistance of the plant 150 against the movement of the crop along the picking element 136. The crop 148 follows the curvature of the picking element 136 as it travels upwards, resulting in the crop 148 being gently removed from the plant 150. In one embodiment, the rotational speed of the axle 114, and thus the picking elements 136, is significantly greater than the forward speed of the harvester 101, resulting in each of the plants 150 being engaged multiple times by picking elements 136. In embodiments where the picking elements 136 of opposing are offset, the picking element 136 from one circular support 118 (i.e. positioned on one side of the plant 150) will engage the plant 150 and then a picking element 136 from the other circular support 118 (i.e. from the opposite side of the plant 150) will engage the plant 150, resulting in a slight side to side motion of the plan as successive elements engage the plant 150.

Figure 7:
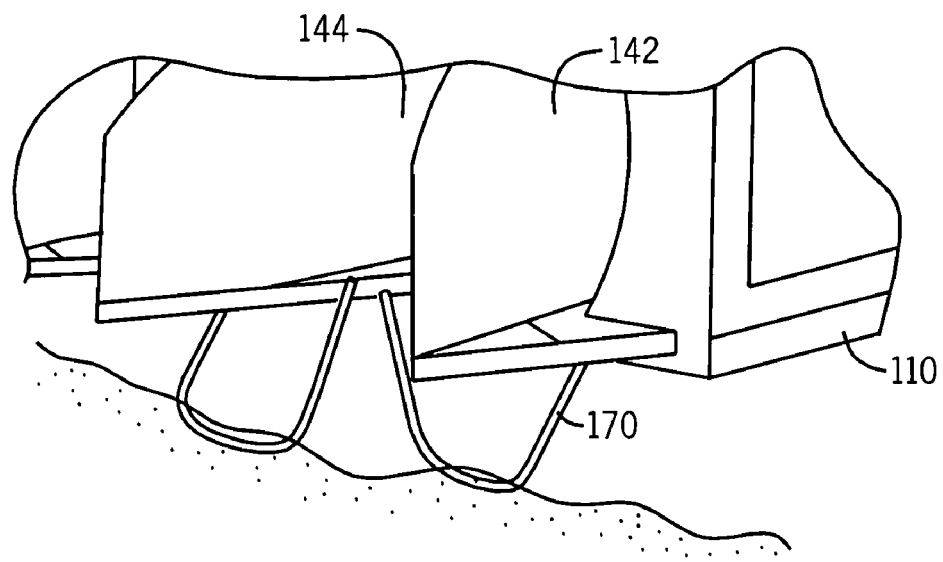
FIG. 7 is a perspective view depicting the harvesting device including a gatherer positioned thereon.
Figure 8:
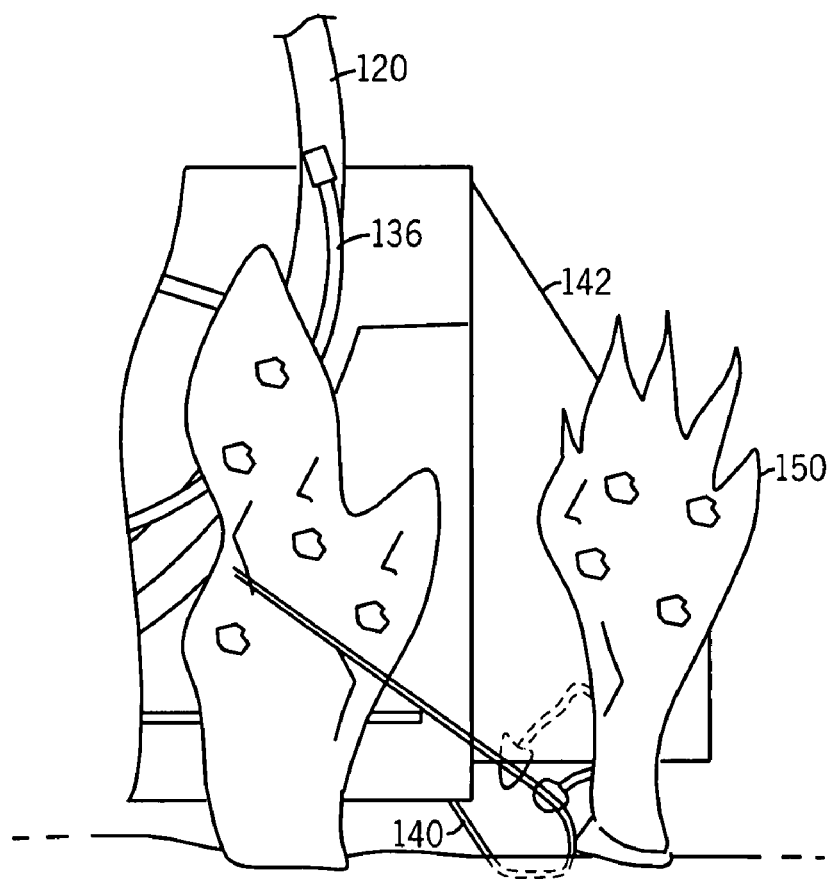
FIG. 8 illustrates the continuous pathway formed by the gatherer and the picking elements.

In one embodiment shown in FIGS. 7 and 8, a gatherer 170 is provided. The gatherer 170 is a protrusion from the housing 110 downwards to the soil which then angles back upwards through the front opening in the housing 110 into the picking path 132. The gatherer 170 provides a path from the ground up to the picking elements 136 (as the rotate). The gatherer 170 may skim the surface of the ground or it may plow a portion, preferably just below the surface, of the soil. The gatherer 170 provides a mechanism to raise branches which may have become broken or two weighed down with the crop 150 to be at an appropriate height to be engaged by the picking elements 136. Therefore, the gather 170 serves as a wedge or ramp along which these fallen branches can travel to the picking elements 136, where the crop 148 on the branches is engaged as described generally in this application.

In one embodiment, each cutting path has associated with it a set of guards 152. Each set of guards 152 includes a portion positioned adjacent the circular support 118 near the bottom of the housing 110. The guards define the picking path 132 through the housing 110 and serve to guide the plants 150 through the housing 110 and to guard against and minimize damage to the plants from the housing. In one embodiment, the guards 152 are constructed of a flexible material.

The picking elements 136 may be sized and shaped to achieve optimal harvesting of a particular crop 148. For example, the diameter or thickness of the picking elements 136 is preferably selected to be small enough to engage the stems of the crops 148 to be picked such that the stems snap off from the plants 150. In one embodiment, a $3/16$ inch diameter is used.

The size of the circular supports 118 may also be varied depending on the type of the crop 148 being picked. The circular supports 118 should be at least twice the height of the plants 150, such that the plants 150 pass under the axle 114.

In one embodiment, the picking elements 136 are rigidly affixed to the outer circular arm 120 at an outer end 138 and to the inner hub 122 at an inner end 139. In an alternative embodiment, the picking element 136 may be connected to the circular support 118 in a manner to provide for a more flexible or wear-resistant connection. For example, but without limitation, the picking elements 136 may be attached to the circular wheel and or the hub in a hinged manner such as via a bracket 166. This form of attachment allows some movement of the picking element 136, preventing the picking element 136 from being sheered away from a completely fixed attachment point such as a weld. In an exemplary embodiment, a cushion or shock absorber 140 is provided between the picking element 136 and the circular support 118, for example, but not limited to at the inner end 139 providing a mechanism to dampen movement between the picking element 136 and the inner hub 122, which can otherwise lead to damage to the harvesting device 105.

In an exemplary embodiment, the tractor 103 includes a power take-off (PTO) shaft for powering the movement of the harvesting device 105 with the energy from the engine of the tractor 103. Alternatively, the harvesting device 105 may include its own source of power.

It should be understood that the above description of the invention and the specific examples and embodiments, while indicating the preferred embodiments of the present invention, are given by demonstration and not limitation. While several examples have been given using peppers as the crop to be picked, it should be appreciated that many other types of plants can be picked using the described device. Many changes and modifications within the scope of the present invention may therefore be made without departing from the spirit of the invention, and the invention includes all such inventions and modifications.

What is claimed is:

1. A mechanical harvesting device comprising:
a housing and central axle rotatable in relation thereto and substantially disposed therein;
the housing having a front opening and a rear opening and a void therebetween corresponding to a picking path, the longitudinal axis of the picking path being perpendicular to the axle;
at least one circular support positioned perpendicular to the axle and affixed thereto such that the circular support and axle are concurrently rotatable;
the circular support further comprising an inner hub and an outer circular arm with at least one picking element disposed therebetween;
the at least one picking element having a curvilinear shape and extending from a plane defined by the circular support into a plane defined by the picking path, the picking element having a length longer than the radius of the circular support from which it extends;
a gatherer positioned at the front opening, the gather having a first end, a curved portion, and a second end, the first end in communication with the housing adjacent the front opening and extending outward from the housing and downward below the housing, the curved portion of the gatherer curving back towards the housing and extending into the picking path, the second end positioned in the picking path substantially adjacent the at least one picking element;
wherein as the mechanical harvester moves forward branches below the housing are engaged by the gatherer and travel along the gatherer to be engaged by the at least one picking element.

2. The mechanical harvester of claim 1, further comprising a trough substantially adjacent each of the at least one circular supports and the trough having an edge parallel with the normal direction of motion of the tractor and defining one side of the picking path and the trough in communication with a transportation system associated with the tractor.

3. The mechanical harvester of claim 1, further comprising guards positioned along the picking path, the guards comprising a shock absorbing material to minimize damage to the plants from contact with the housing.

4. The mechanical harvester of claim 1, wherein the picking elements have a first curved end and a second curved end both curved in the same lateral direction and further wherein the picking elements have a middle curved portion between the first and second curved ends, the middle curved portion curved in the longitudinal direction.

5. The mechanical harvester of claim 4, wherein the picking elements have length of at least ¾ the diameter of the circular supports 6. The mechanical harvester of claim 1, wherein the at least one circular support comprises at least one set of paired circular supports, each circular support of the set of paired circular supports positioned opposite the other circular support in the set of paired circular supports across the picking path such that each circular support's respective picking elements extend towards the other circular support of the set of paired circular supports and into the picking path.

7. The mechanical harvester of claim 1, wherein the picking element is hingedly connected to the inner hub and the outer hub and wherein a shock absorber is further disposed between the picking element and the circular support.

8. The mechanical harvester of claim 1, wherein the picking element has a shape of a oblate ellipsoid and wherein the polar radius of the ellipsoid is greater than that of the equatorial radius.

9. A mechanical harvesting device comprising:
a housing and central axle rotatable in relation thereto and substantially disposed therein;
the housing having a front opening and a rear opening and a void therebetween corresponding to a picking path, the longitudinal axis of the picking path being perpendicular to the axle;
at least one circular support positioned perpendicular to the axle and affixed thereto such that the circular support and axle are concurrently rotatable;
the circular support further comprising an inner hub and an outer circular arm with at least one picking element disposed therebetween;
the at least one picking element having a curvilinear shape and extending from a plane defined by the circular support into a plane defined by the picking path, the picking element having a length longer than the radius of the circular support from which it extends;
guards positioned along the picking path, the guards comprising a shock absorbing material to minimize damage to the plants from contact with the housing
a gatherer positioned at the front opening, the gather having a first end, a curved portion, and a second end, the first end in communication with the housing adjacent the front opening and extending outward from the housing and downward below the housing, the curved portion of the gatherer curving back towards the housing and extending into the picking path, the second end positioned in the picking path substantially adjacent the at least one picking element;
wherein as the mechanical harvester moves forward branches below the housing are engaged by the gatherer and travel along the gather to be engaged by the at least one picking element.

10. A mechanical harvesting device comprising:
a housing and central axle rotatable in relation thereto and substantially disposed therein;
the housing having a front opening and a rear opening and a void therebetween corresponding to a picking path, the longitudinal axis of the picking path being perpendicular to the axle;
at least one circular support positioned perpendicular to the axle and affixed thereto such that the circular support and axle are concurrently rotatable;
the circular support further comprising an inner hub and an outer circular arm with at least one picking element disposed therebetween;
the at least one picking element having a curvilinear shape and extending from a plane defined by the circular support into a plane defined by the picking path, the picking element having a length longer than the radius of the circular support from which it extends, the picking element is hingedly connected to the inner hub and the outer hub;
a gatherer positioned at the front opening, the gather having a first end, a curved portion, and a second end, the first end in communication with the housing adjacent the front opening and extending outward from the housing and downward below the housing, the curved portion of the gatherer curving back towards the housing and extending into the picking path, the second end positioned in the picking path substantially adjacent the at least one picking element;
a shock absorber disposed between the picking element and the circular support, wherein as the mechanical harvester moves forward branches below the housing are engaged by the gatherer and travel along the gather to be engaged by the at least one picking element.

* * * * *